United States Patent [19]

Okawa et al.

[11] Patent Number: 4,745,093

[45] Date of Patent: May 17, 1988

[54] DIELECTRIC CERAMIC COMPOSITION

[75] Inventors: Takashi Okawa, Kokubu; Nobuo Yokoe, Hayato, both of Japan

[73] Assignee: Kyocera Corporation, Kyoto, Japan

[21] Appl. No.: 802,037

[22] Filed: Nov. 26, 1985

[30] Foreign Application Priority Data

Nov. 27, 1984 [JP] Japan ................................ 59-251322

[51] Int. Cl.$^4$ ........................ C04B 35/46; C04B 35/00
[52] U.S. Cl. .................................... 501/138; 501/135; 501/139
[58] Field of Search ................ 501/135, 136, 138, 139

[56] References Cited

U.S. PATENT DOCUMENTS

| | | | |
|---|---|---|---|
| 3,775,142 | 11/1973 | Roup | 501/136 |
| 4,585,745 | 4/1986 | Tunooka et al. | 501/135 OR |
| 4,593,008 | 6/1986 | Okawa et al. | 501/135 |

FOREIGN PATENT DOCUMENTS

| | | | |
|---|---|---|---|
| 53-60541 | 5/1978 | Japan | 501/135 |
| 54-124299 | 9/1979 | Japan | 501/135 |
| 56-82501 | 7/1981 | Japan | 501/135 |
| 58-60660 | 4/1983 | Japan . | |
| 58-60661 | 4/1983 | Japan . | |
| 59-147474 | 8/1984 | Japan . | |
| 60-56306 | 4/1985 | Japan | 501/135 |
| 596557 | 2/1978 | U.S.S.R. | 501/135 |

*Primary Examiner*—Mark L. Bell
*Assistant Examiner*—Karl Group
*Attorney, Agent, or Firm*—Spensley Horn Jubas & Lubitz

[57] ABSTRACT

Disclosed is a dielectric ceramic material having a chemical composition represented by the formula $Sr(Ni_{1/3}Nb_{2/3})O_3$ or $(1-x)Sr(Ni_{1/3}Nb_{2/3})O_3 \cdot xBaTiO_3$ in which x is a positive number of up to 0.3 and also having a perovskite structure. This dielectric material has a small dielectric loss and a large dielectric constant, and the temperature coefficient of the resonance frequency can be controlled to a small value within a certain range. The dielectric ceramic material is valuably used for microwave dielectric ceramics.

1 Claim, 3 Drawing Sheets

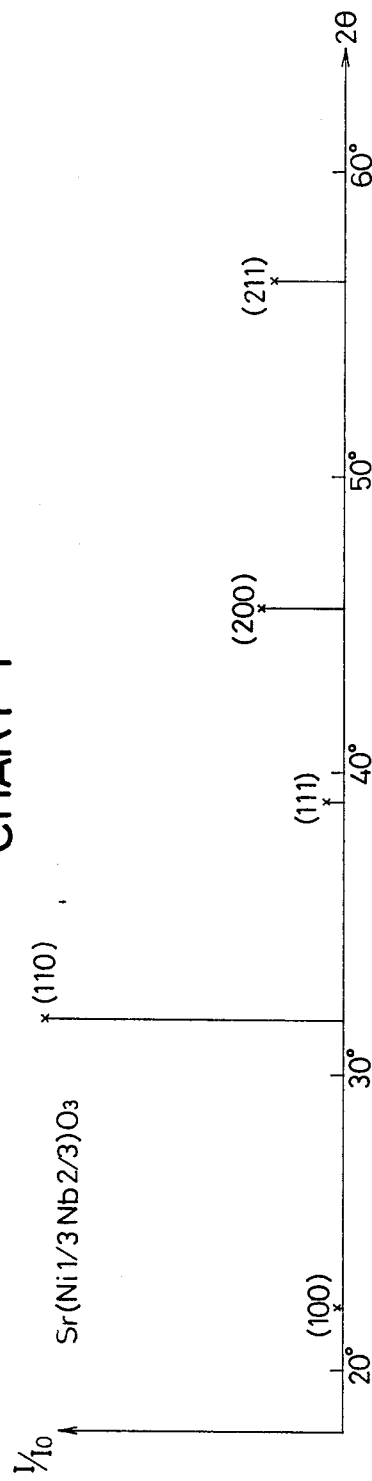

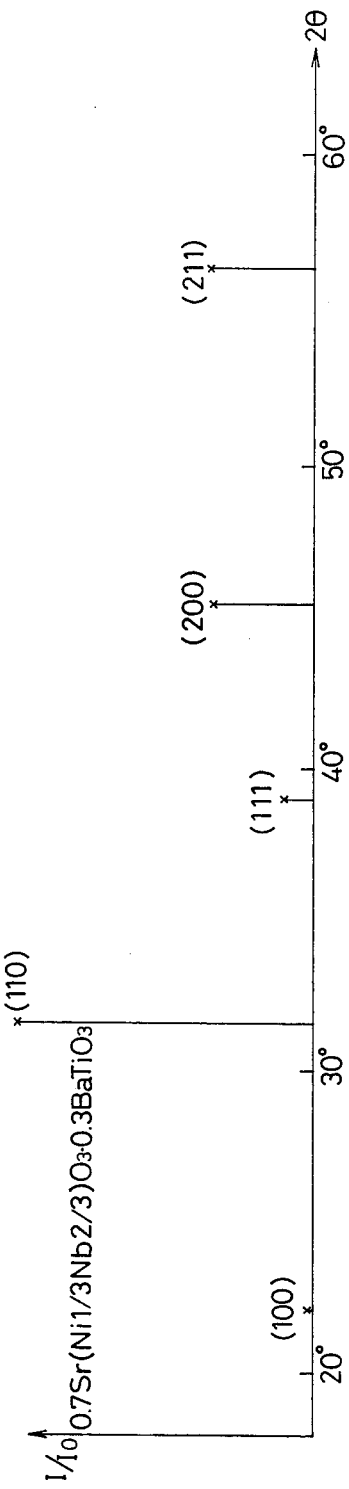
CHART 2
| 0.7Sr(Ni1/3Nb2/3)O₃·0.3BaTiO₃ | | | |
|---|---|---|---|
| 2θ | α | hkℓ | I/Io |
| 22.1 | 4.019 | (100) | 1 |
| 31.6 | 2.829 | (110) | 100 |
| 39.0 | 2.307 | (111) | 10 |
| 45.4 | 1.996 | (200) | 33 |
| — | — | (210) | — |
| 56.4 | 1.630 | (211) | 35 |

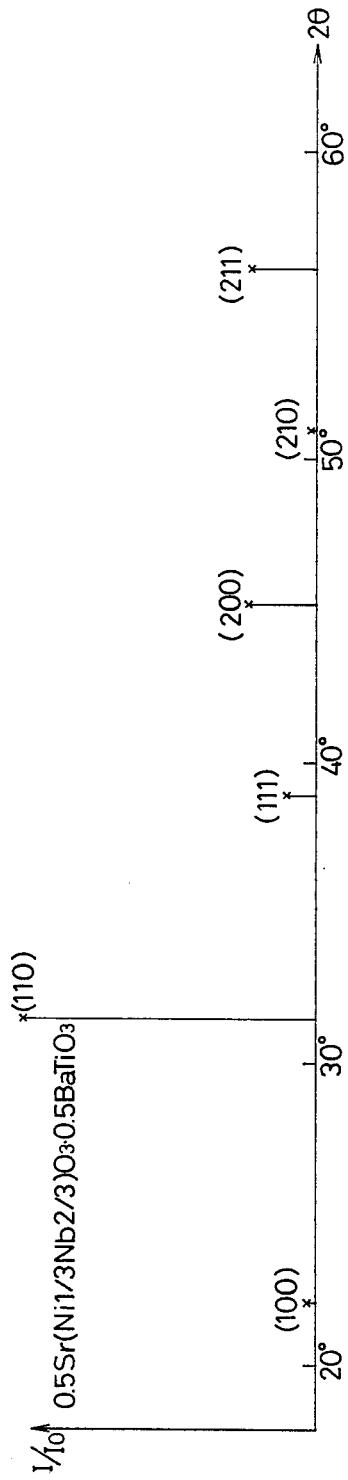
CHART 3
$0.5Sr(Ni_{1/3}Nb_{2/3})O_3 \cdot 0.5BaTiO_3$
| $0.5Sr(Ni_{1/3}Nb_{2/3})O_3 \cdot 0.5BaTiO_3$ | | |
|---|---|---|
| 2θ | d | hkℓ | I/I₀ |
| 22.1 | 4.019 | (100) | 3 |
| 31.5 | 2.838 | (110) | 100 |
| 38.9 | 2.313 | (111) | 10 |
| 45.2 | 2.004 | (200) | 23 |
| 50.9 | 1.792 | (210) | 1 |
| 56.2 | 1.635 | (211) | 23 |

DIELECTRIC CERAMIC COMPOSITION

BACKGROUND OF THE INVENTION (1) Field of the Invention

The present invention relates to a dielectric ceramic composition. More particularly, the present invention relates to a dielectric ceramic composition comprising a perovskite type compound having a novel chemical composition, which is especially valuable as a dielectric resonator to be used in the microwave region. (2) Description of the Prior Art Recently, dielectric ceramic materials are widely used in the microwave region with practical application of car telephones and personal wireless installations, conversion of microwave circuits to integrated circuits and application to gun oscillators. These microwave dielectric ceramics are mainly used for resonators, and the properties required for resonators are as follows. Namely, (1) since the wavelength is shortened to $1/\sqrt{\epsilon}$ ($\epsilon$ stands for the dielectric constant), the dielectric constant should be large so as to satisfy the requirment of reduction of the size, (2) the dielectric loss at a high frequency should be small, and (3) the change of the resonance frequency according to the temperature, that is, the temperature dependency of the dielectric constant, should be small and stable.

As the known dielectric ceramic material of this type, there can be mentioned a material of the $BaO-TiO_2$ system, a material of the $REO-BAO-TiO_2$ system (RE stands for a rare earth element) and a material of the $(BaSrCa)(ZrTi)O_3$ system.

The material of the $BaO-TiO_2$ system has a dielectric constant $\epsilon r$ is as high as 38 to 40 and the dielectric loss tan $\delta$ is less tan $2.00 \times 10^{-4}$, but a single phase material having a temperature coefficient $\tau f$ of 0 can hardly be obtained and the changes of the dielectric constant and the temperature dependency of the dielectric constant according to the change of the composition are great. Accordingly, it is difficult to control the temperature coefficient ($\tau f$) of the resonance frequency at a low level stably while maintaining a high dielectric constant and a low dielectric loss. In case of the material of the $REO-BaO-TiO_2$ system, the dielectric constant $\epsilon r$ is very high and 40 to 60 and a product in which the temperature coefficient $\tau f$ of the resonance frequency is 0 can be obtained, but the dielectric loss tan $\delta$ is large and exceeds $5.0 \times 10^{-4}$. In the material of the $(BaSrCa)(ZrTi)O_3$ system, the dielectric loss tan $\delta$ is small and less than $2.00 \times 10^{-4}$ and the dielectric constant $\epsilon r$ is appropriate, but the deviation of the temperature coefficient $\tau f$ of the resonance frequency is great and it is difficult to obtain products having constant properties stably. Incidentally, the dielectric loss tan $\delta$ referred to in the instant specification is the value measured at 500 to 600 MHz by using a di-entrant resonator. As is seen from the foregoing description, a composition capable of completely satisfying the above-mentioned requirements for the microwave dielectric material has not been developed.

SUMMARY OF THE INVENTION

We found that strontium nickelniobate having a perovskite structure and a dielectric ceramic material consisting of a solid solution having a specific composition comprising this compound and barium titanate have the above-mentioned three properties required for the microwave dielectric material.

According to the present invention, there is provided a dielectric ceramic composition for microwaves, which has a relatively high dielectric constant and a dielectric loss maintained at a low level and also has a small and stable temperature dependency of the dielectric constant. Accordingly, the temperature dependency of the resonance frequency of a dielectric resonator formed by using the dielectric ceramic composition of the present invention is small and stable.

In accordance with one fundamental aspect of the present invention, there is provided a dielectric ceramic material comprising strontium nickelniobate having a perovskite structure.

In accordance with another aspect of the present invention, there is provided a dielectric ceramic material comprising a composition comprising strontium nickelniobate and barium titanate and having a perovskite structure.

BRIEF DESCRIPTION OF THE DRAWINGS

Chart 1 shows a Cu-K$\alpha$ X-ray diffraction pattern of strontium nickelniobate according to the present invention.

Chart 2 shows a Cu-K$\alpha$ X-ray diffraction pattern of a solid solution comprising 70 mole % of strontium mickelniobate and 30 mole % of barium titanate according to the present invention.

Chart 3shows a Cu-K$\alpha$ X-ray diffraction pattern of a solid solution comprising 50 mole % of strontium nickelniobate and 50 mole % of barium titanate according to the present invention.

DETAILED DESCRIPTION OF THE PREFERRED EMBODIMENTS

The dielectric ceramic material of the present invention is characterized in that it comprises strontium nickelniobate having a perovskite structure. An oxide having a perovskite structure has a composition represented by the following general formula:

$$ABO_3 \quad (1)$$

wherein A and B are such metals that the sum of valencies of both the metals are $\pm 6$.

In the strontium nickelniobate used in the present invention, the element A is strontium and the element B consists of a combination of Ni (II) and Nb (V). Ideally, the strontium nickelniobate has a chemical composition represented by the following formula:

$$Sr(Ni_{1/3}Nb_{2/3})O_3 \quad (2)$$

Of course, the ratios of Sr, Ni and Nb may be deviated from the range represented by the formula (2) to some extent, so far as the strontium nickelniobate has a perovskite structure.

Chart 1 shows a Cu-K$\alpha$ X-ray diffraction pattern of the above-mentioned strontium nickelniobate, and from this Chart 1, it will be understood that the strontimum nickelniobate has a perovskite structure.

In the present invention, a dielectric ceramic material can be formed solely of strontium nickelniobate. Furthermore, a composition comprising strontium nickelniobate and barium titanate and having a perovskite structure may be used for formation of a dielectric ceramic material.

Strontium nickelniobate having a perovskite structure is characterized in that the dielectric loss tan δ is low at $1.7 \times 10^{-4}$, but the dielectric constant εr is relatively small at 32 and the temperature coefficient (τf) is relatively large at −47.5 ppm/°C. When barium titanate is incorporated in strontium nickelniobate, the dielectric constant εr is substantially linearly increased with increase of the molar ratio of barium titanate and the temperature coefficient can be controlled to a small value. In order to control the dielectric loss to a small value and control the temperature coefficient τf (ppm/°C.) of the resonance frequency to a relatively small value, it is preferred that barium titanate be present in an amount of up to 30 mole % based on the dielectric composition.

Chart 2 shows a Cu-Kα X-ray diffraction pattern of a strontium nickelniobate/barium titanate according to the present invention. From Chart 2, it will be understood that also these compositions have a perovskite structure. These compositions are in the form of a solid solution comprising barium titanate solid-dissolved in the crystal phase of strontium nickelniobate.

The dielectric material of this type according to the present invention has a chemical composition represented by the following formula:

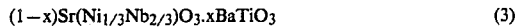

$(1-x)Sr(Ni_{1/3}Nb_{2/3})O_3 \cdot xBaTiO_3$     (3)

wherein x is a positive number of up to 0.3.

If the value of x is smaller than 0.25, a dielectric ceramic material having a temperature coefficient smaller than ±50 ppm/°C. is preferably provided.

In a high-frequency dielectric material to be used for a duplexer such as a personal wireless installation, it is preferred that the temperature frequency (τf) of the resonance frequency be in the range of $|\tau f| \leq 20$, and in order to control the temperature coefficient τf of the resonator frequency within this preferred range, it is preferred that the value x in the formula (3) be in the range of from 0.06 to 0.20.

The dielectric ceramic material of the present invention can be obtained by mixing strontium carbonate, nickel oxide and niobium oxide at the above-mentioned composition ratio, pulverizing the mixture according to the dry or wet method, calcining the mixture at a temperature of 110° to 1400° C. for 1 to 4 hours, shaping the calcined mixture into an optional form and sintering the molded body at a temperature of 1400° to 1700° C. to produce a perovskite structure, though the applicable process is not limited to this process. If barium carbonate and titanium oxide are mixed in addition to the above ingredients at the above-mentioned composition ratio and the mixture is treated in the same manner as described above, a composition of the solid solution type can be obtained.

The material of the present invention can be used for various microwave dielectric ceramic articles and this especially valuably used for a resonator.

The material of the present invention completely satisfies the above-mentioned three requirements for microwave dielectric materials. Namely, the material of the present invention is characterized in that (1) the dielectric constant εr is relatively high at about 32 to about 47, (2) the dielectric loss tan δ is very small at $1.63 \times 10^{-4}$ to $3.80 \times 10^{-4}$, and (3) by changing the value x of the composition formula, the temperature coefficient f can be controlled within a range of −47.5 to +111.5 ppm/°C. However, if the value x exceeds 0.3, the specific inductive capacity is increased, but the temperature coefficient τf is extremely shifted to the positive side and the dielectric loss tan δ is increased and $2.82 \times 10^{-3}$ in case of x=0.5. If the composition ratio of SrO, BaO, NiO, Nb₂O₃ and TiO₃ is deviated from the range represented by the composition formula of $(1-x)Sr(Ni_{1/3}Nb_{2/3})O_3 \cdot xBaTiO_3$, the perovskite crystal structure is destroyed and the composition is not of the single phase, and the above-mentioned excellent dielectric properties are degraded.

The present invention will now be described in detail with reference to the following example that by no means limits the scope of the invention.

EXAMPLE

High-purity strontium carbonate ($SrCO_3$), barium carbonate ($BaCO_3$), nickel oxide (NiO), niobium oxide ($Nb_2O_5$) and titanium oxide ($TiO_2$) were weighed so that the composition value x was as shown in Table 1 and they were wet-mixed overnight by using agate balls. The mixture was dried and calcined at 1300° C. for 2 hours, and a binder was added in an amount of about 1% by weight and the mixture was granulated. The obtained powder was molded under a pressure of about 800 kg/cm² and the molded body was sintered in air at a temperature of 1400° to 1700° C. for 2 hours.

The dielectric constant, dielectric loss and the temperature coefficient of the resonance frequency were measured at 500 to 600 MHz with respect to each sample by using a di-entant resonant.

The obtained results are shown in Table 1.

TABLE 1

| Sample No. | Composition (value x) | Dielectric Constant (εr) | Dielectric Loss (tan δ) | Temperature Coefficient τf (ppm/°C.) |
|---|---|---|---|---|
| 1 | 0 | 32.2 | $1.78 \times 10^{-4}$ | −47.5 |
| 2 | 0.05 | 32.8 | $1.63 \times 10^{-4}$ | −22.3 |
| 3 | 0.06 | 33.0 | $1.95 \times 10^{-4}$ | −18.1 |
| 4 | 0.07 | 33.1 | $2.48 \times 10^{-4}$ | −13.1 |
| 5 | 0.10 | 34.7 | $2.86 \times 10^{-4}$ | −9.0 |
| 6 | 0.15 | 37.3 | $2.24 \times 10^{-4}$ | +2.5 |
| 7 | 0.17 | 38.6 | $2.35 \times 10^{-4}$ | +7.8 |
| 8 | 0.18 | 39.4 | $2.26 \times 10^{-4}$ | +10.9 |
| 9 | 0.20 | 40.2 | $2.32 \times 10^{-4}$ | +16.1 |
| 10 | 0.25 | 43.3 | $2.74 \times 10^{-4}$ | +45.6 |
| 11 | 0.27 | 45.1 | $3.15 \times 10^{-4}$ | +69.1 |
| 12 | 0.30 | 47.1 | $3.80 \times 10^{-4}$ | +111.5 |
| 13 | 0.50 | 83.2 | $2.82 \times 10^{-3}$ | +281 |

Each of samples 1 through 12 shown in Table 1 is a composition represented by the formula $(1-x)Sr(Ni_{1/3}Nb_{2/3}) \cdot xBaTiO_3$ ($0 \leq x \leq 0.3$) of the present inventon, and the temperature coefficient τf (ppm/°C.) is controlled according to the present invention. On the other hand, sample 13 is outside the scope of the present invention because x is 0.5.

In each of samples 1 through 12, the dielectric constant (εr) is relatively high and 32 to 47 and the dielectric loss (tan δ) is very small and $1.63 \times 10^{-4}$ to $3.80 \times 10^{-4}$. Furthermore, by changing the value x of the composition formula, the temperature coefficient (τf) of the resonance frequency can be controlled within a range of from −47.5 to +111.5.

In sample 13 where x is 0.5, the dielectric constant is large, but the temperature coefficient τf is increased to the positive side and is +281 and the dielectric loss is large and $2.82 \times 10^{-3}$. Accordingly, sample 13 is not practically applicable.

As is apparent from the foregoing description, the dielectric ceramic material of the present invention having a composition represented by the formula $(1-x)Sr(Ni_{1/3}Nb_{2/3})\text{-}xBaTiO_3$ ($0 \leq x \leq 0.3$) and a perovskite crystal structure has all of the following three characteristics required for high-frequency dielectric ceramic materials; that is, (1) the dielectric constant ($\epsilon r$) is relatively high, (2) the dielectric loss is small, and (3) the temperature dependency of the resonance frequency can be easily controlled.

We claim:

1. A dielectric ceramic material consisting essentially of a solid solution of strontium nickelniobate and barium titanate represented by the following formula:

$$(1-x)Sr(Ni_{1/3}Nb_{2/3})O_3 \cdot x\, BaTiO_3,$$

wherein x is a positive number of from 0.06 to 0.20 and said dielectric ceramic material has a perovskite structure.

* * * * *